(12) United States Patent
Chang et al.

(10) Patent No.: US 10,848,099 B2
(45) Date of Patent: Nov. 24, 2020

(54) POWER GENERATION ABNORMALITY DETECTION METHOD AND SYSTEM THEREOF FOR PHOTOVOLTAIC PANELS

(71) Applicant: Ablerex Electronics Co., Ltd., New Taipei (TW)

(72) Inventors: Yao-Jen Chang, Kaohsiung (TW); Chia-Hung Lee, Kaohsiung (TW); Jia-Min Shen, Kaohsiung (TW); Yu-Hsiu Lin, Kaohsiung (TW)

(73) Assignee: ABLEREX ELECTRONICS CO., LTD., New Taipei (TW)

( * ) Notice: Subject to any disclaimer, the term of this patent is extended or adjusted under 35 U.S.C. 154(b) by 347 days.

(21) Appl. No.: 15/391,975

(22) Filed: Dec. 28, 2016

(65) Prior Publication Data

US 2017/0294877 A1    Oct. 12, 2017

(30) Foreign Application Priority Data

Apr. 8, 2016  (TW) .............................. 105111066 A

(51) Int. Cl.
*H02S 50/00* (2014.01)
*H02J 3/38* (2006.01)
*H02M 7/44* (2006.01)
*H02S 50/10* (2014.01)
*H02M 1/32* (2007.01)

(52) U.S. Cl.
CPC .............. *H02S 50/00* (2013.01); *H02J 3/383* (2013.01); *H02M 1/32* (2013.01); *H02M 7/44* (2013.01); *H02S 50/10* (2014.12); *Y02E 10/56* (2013.01)

(58) Field of Classification Search
CPC .......... H02S 50/00; H02S 50/10; H02M 1/32; H02M 7/44; H02J 3/383; Y02E 10/56
USPC ....................................... 324/761.01; 307/64
See application file for complete search history.

(56) References Cited

U.S. PATENT DOCUMENTS

| | | | |
|---|---|---|---|
| 8,446,043 B1* | 5/2013 | Bundschuh | H02J 1/00 307/80 |
| 2011/0186102 A1* | 8/2011 | Kobayashi | H01L 31/03928 136/244 |
| 2013/0300449 A1 | 11/2013 | Nakamura et al. | |
| 2016/0019323 A1 | 1/2016 | Tsuruta et al. | |

* cited by examiner

*Primary Examiner* — Farhana A Hoque
(74) *Attorney, Agent, or Firm* — Che-Yang Chen; Law Office of Michael Chen

(57) ABSTRACT

A power generation abnormality detection method includes operating a power converter to controllably operate a solar cell module at a plurality of predetermined voltage points to obtain a plurality of measured currents, utilizing the predetermined voltage points and measured currents to calculate a plurality of first power data, comparing the plurality of first power data with a first PV curve, or operating the power converter to controllably operate the solar cell module at a plurality of predetermined current points to obtain a plurality of measured voltages, utilizing the predetermined current points and measured voltages to calculate a plurality of second power data, and comparing the plurality of second power data with a second PV curve.

20 Claims, 4 Drawing Sheets

POWER GENERATION ABNORMALITY DETECTION METHOD AND SYSTEM THEREOF FOR PHOTOVOLTAIC PANELS

BACKGROUND OF THE INVENTION

1. Field of the Invention

The present invention relates to a power generation abnormality detection method and system thereof for photovoltaic panels. Particularly, the present invention relates to the power generation abnormality (e.g. failure, aging or shadowing) detection method and system thereof for photovoltaic panels. More particularly, the present invention relates to the power generation abnormality detection method and system thereof for photovoltaic panels, executing with a power converter or an inverter.

2. Description of the Related Art

For example, U.S. Patent Publication No. 20160019323, entitled "Solar Power Generation System, Abnormality Determination Processing Device, Abnormality Determination Processing Method, and Program," discloses an abnormality determination processing device for a solar power generation system. The solar power generation system includes a solar power generation module, a power measurement unit, an inverter, a solar radiation meter and an abnormality determination unit.

However, the abnormality determination processing method is only suitable for the solar power generation system provided with the solar radiation meter and the abnormality determination processing device which further connects with the power measurement unit to retrieve power data. Disadvantageously, this results in increasing the dimensions of abnormality determination processing device and further sophisticating the procedure of abnormality determination processing method.

Another U.S. Patent Publication No. 20130300449, entitled "Solar Power Generation System, Abnormality Detection Method, and Abnormality Detection System," also discloses an abnormality detection system for a solar power generation system. The abnormality detection system connects with a solar battery which includes a current detection unit and a voltage detection unit. The abnormality detection system includes a characteristic calculation unit, an abnormality detection unit and an environment measurement unit.

However, the abnormality detection system must be provided with the characteristic calculation unit, the abnormality detection unit and the environment measurement unit and is suitable for the solar battery provided with the current detection unit and the voltage detection unit. Furthermore, the abnormality detection system must connect with the current detection unit and the voltage detection unit to retrieve current and voltage data of the solar battery. Disadvantageously, this results in increasing the dimensions of abnormality detection system and further sophisticating the procedure of abnormality detection method.

However, there is a need of improving the conventional abnormality detection method and the conventional abnormality detection system of the solar power generation system, with simplifying the procedure of abnormality detection and minimizing dimensions of the entire structure. The above-mentioned prior art is incorporated herein by reference for purposes including, but not limited to, indicating the background of the present invention and illustrating the situation of the art.

As is described in greater detail below, the present invention provides a power generation abnormality detection method and system thereof for photovoltaic panels. A solar cell module is controllably operated at a series of predetermined voltage points by a power converter, thereby retrieving a series of measured currents corresponding to the series of predetermined voltage points. The predetermined voltage points and the measured currents are calculated to obtain a plurality of first power data which is compared with a first PV curve for abnormality detection. Alternatively, the solar cell module is controllably operated at a series of predetermined current points by the power converter, thereby retrieving a series of measured voltages corresponding to the series of predetermined current points. The predetermined current points and the measured voltages are calculated to obtain a plurality of second power data which is compared with a second PV curve for abnormality detection in such a way as to overcome the problems of the conventional abnormality detection method and system thereof.

SUMMARY OF THE INVENTION

The primary objective of this invention is to provide a power generation abnormality detection method and system thereof for photovoltaic panels. A solar cell module is controllably operated at a series of predetermined voltage points by a power converter (or inverter), thereby retrieving a series of measured currents corresponding to the series of predetermined voltage points. The predetermined voltage points and the measured currents are calculated to obtain a plurality of first power data (or first power-related data) which is compared with a first PV curve for abnormality detection. Advantageously, the power generation abnormality detection method and system of the present invention are successful in simplifying the procedure of abnormality detection and minimizing dimensions of the entire structure.

Another objective of this invention is to provide a power generation abnormality detection method and system thereof for photovoltaic panels. A solar cell module is controllably operated at a series of predetermined current points by a power converter (or inverter), thereby retrieving a series of measured voltages corresponding to the series of predetermined current points. The predetermined current points and the measured voltages are calculated to obtain a plurality of second power data (or second power-related data) which is compared with a second PV curve for abnormality detection. Advantageously, the power generation abnormality detection method and system of the present invention are successful in simplifying the procedure of abnormality detection and minimizing dimensions of the entire structure.

The power generation abnormality detection method for photovoltaic panels in accordance with an aspect of the present invention includes:

controllably operating solar cell module at a series of predetermined voltage points via a power converter or an inverter;

retrieving a series of measured currents corresponding to the series of predetermined voltage points;

utilizing previously-operated voltages of the predetermined voltage points and the measured currents to calculate a plurality of first power data or first power-related data with a predetermined power equation; and comparing the plurality of first power data or first power-related data with a first PV curve for detecting abnormality of the solar cell module.

In a separate aspect of the present invention, the series of predetermined voltage points are a plurality of voltage-decreasing points, with decreasing the plurality of voltage-decreasing points from a high voltage point to a low voltage point.

In a further separate aspect of the present invention, the plurality of voltage-decreasing points decrease from an open-circuit voltage point to a short-circuit voltage point.

In yet a further separate aspect of the present invention, the series of predetermined voltage points are a plurality of voltage-increasing points, with increasing the plurality of voltage-increasing points from a low voltage point to a high voltage point.

In yet a further separate aspect of the present invention, the plurality of voltage-increasing points increase from a short-circuit voltage point to an open-circuit voltage point.

In yet a further separate aspect of the present invention, in abnormality detection, the power converter is controlled to terminate a procedure of maximum power point tracking.

The power generation abnormality detection method for photovoltaic panels in accordance with an aspect of the present invention includes:

controllably operating a solar cell module a series of predetermined current points with a power converter or an inverter;

retrieving a series of measured voltages corresponding to the series of predetermined current points;

utilizing previously-operated currents of the predetermined current points and the measured voltages to calculate a plurality of second power data or second power-related data with a predetermined power equation; and comparing the second power data or second power-related data with a second PV curve for detecting abnormality of the solar cell module.

In a separate aspect of the present invention, the series of predetermined current points are a plurality of current-decreasing points, with decreasing the plurality of current-decreasing points from a high current point to a low current point.

In a further separate aspect of the present invention, the plurality of current-decreasing points decrease from a short-circuit current point to an open-circuit current point.

In yet a further separate aspect of the present invention, the series of predetermined current points are a plurality of current-increasing points, with increasing the plurality of current-increasing points from a low current point to a high current point.

In yet a further separate aspect of the present invention, the plurality of current-increasing points increase from an open-circuit current point to a short-circuit current point.

In yet a further separate aspect of the present invention, in abnormality detection, the power converter is controlled to terminate a procedure of maximum power point tracking.

The power generation abnormality detection system for photovoltaic panels in accordance with an aspect of the present invention includes:

at least one solar cell module including solar cell sub-modules;

at least one power converter connecting with the solar cell module; and an abnormality testing system connecting with the power converter;

wherein, in a voltage control mode, the solar cell module is controllably operated at a series of predetermined voltage points by a power converter, thereby retrieving a series of measured currents corresponding to the series of predetermined voltage points, with utilizing previously-operated voltages of the predetermined voltage points and the measured currents to calculate a plurality of first power data with a predetermined power equation, with comparing the first power data with a first PV curve for abnormality detection; or wherein, in a current control mode, the cell module is controllably operated at a series of predetermined current points by the power converter, thereby retrieving a series of measured voltages corresponding to the series of predetermined current points, with utilizing previously-operated currents of the predetermined current points and the measured voltages to calculate a plurality of second power data with a predetermined power equation, with comparing the second power data with a second PV curve for abnormality detection.

In a separate aspect of the present invention, the series of predetermined voltage points are a plurality of voltage-decreasing points, with decreasing the plurality of voltage-decreasing points from a high voltage point to a low voltage point.

In a further separate aspect of the present invention, the plurality of voltage-decreasing points decrease from an open-circuit voltage point to a short-circuit voltage point.

In yet a further separate aspect of the present invention, the series of predetermined voltage points are a plurality of voltage-increasing points, with increasing the plurality of voltage-increasing points from a low voltage point to a high voltage point.

In yet a further separate aspect of the present invention, the plurality of voltage-increasing points increase from a short-circuit voltage point to an open-circuit voltage point.

In yet a further separate aspect of the present invention, the series of predetermined current points are a plurality of current-decreasing points, with decreasing the plurality of current-decreasing points from a high current point to a low current point.

In yet a further separate aspect of the present invention, the plurality of current-decreasing points decrease from a short-circuit current point to an open-circuit current point.

In yet a further separate aspect of the present invention, the series of predetermined current points are a plurality of current-increasing points, with increasing the plurality of current-increasing points from a low current point to a high current point.

In yet a further separate aspect of the present invention, the plurality of current-increasing points increase from an open-circuit current point to a short-circuit current point.

In yet a further separate aspect of the present invention, the power converter is an inverter or a micro inverter.

In yet a further separate aspect of the present invention, the abnormality testing system connects with a cloud server.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a power generation abnormality detection method and system thereof for photovoltaic panels in accordance with the preferred embodiment of the present invention can be applicable to various solar cell modules, for example, including monocrystalline silicon solar cell modules, polycrystalline silicon solar cell modules or amorphous silicon solar cell modules, which are not limitative of the present invention.

Figure 1:
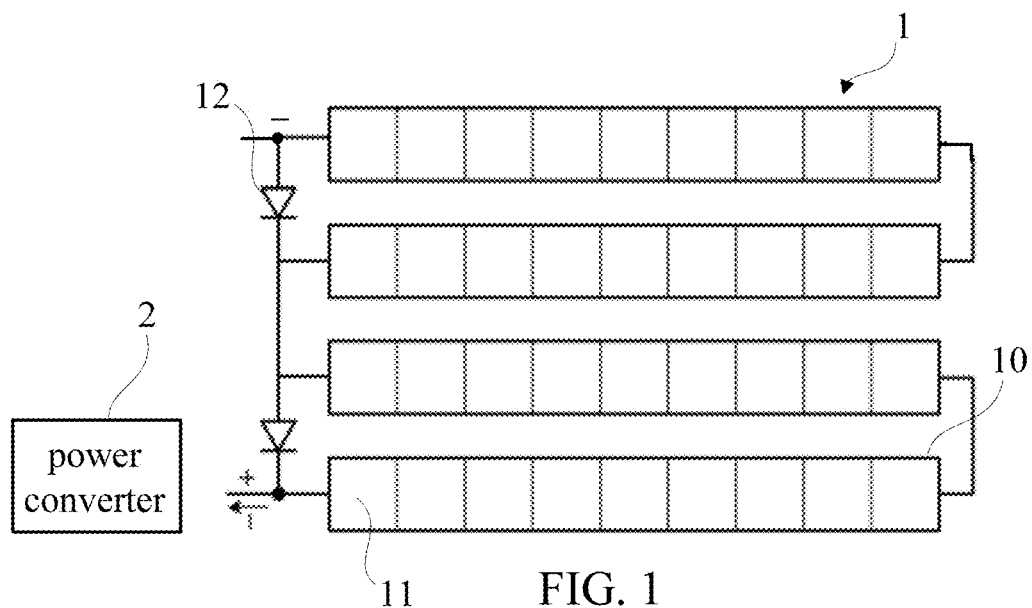
FIG. 1 is a schematic view of a solar cell module suitable for implementing a power generation abnormality detection method and system thereof in accordance with a preferred embodiment of the present invention.

FIG. 1 shows a schematic view of a solar cell module suitable for implementing a power generation abnormality detection method and system thereof in accordance with a preferred embodiment of the present invention. Referring initial to FIG. 1, a solar cell module 1 includes a plurality of solar cell sub-modules (a string of solar cell units) 10 and a plurality of bypass diodes 12. Each of the solar cell sub-modules 10 include a plurality of solar cells which are serially connected. The solar cell sub-modules 10 further connect with at least one or a number of the bypass diodes 12.

With continued reference to FIG. 1, by way of example, if the solar cell module 1 normally operates at a fixed ambient temperature without a shadow shading thereon, the solar cell module 1 can generate currents with various V-I curves according to solar irradiance, thereby supplying power with various V-P curves. Similarly, suppose the solar cell module 1 operates at a constant solar irradiance without a shadow shading thereon, the solar cell module 1 can also generate currents with various V-I curves according to various ambient temperatures, thereby supplying power with various V-P curves.

With continued reference to FIG. 1, the solar cell module 1 further connects with a power converter 2 (e.g. full-bridge power converter) which can be selected from a PV inverter or a micro inverter to convert the power energy generated from the solar cell module 1 into converted output power. By way of example, the power converter 2 is generally operated in a procedure of maximum power point tracking (MPPT). Advantageously, the solar cell module 1 is controllably operated in the procedure of maximum power point tracking to supply an output voltage or current according to various solar irradiances.

Figure 2:
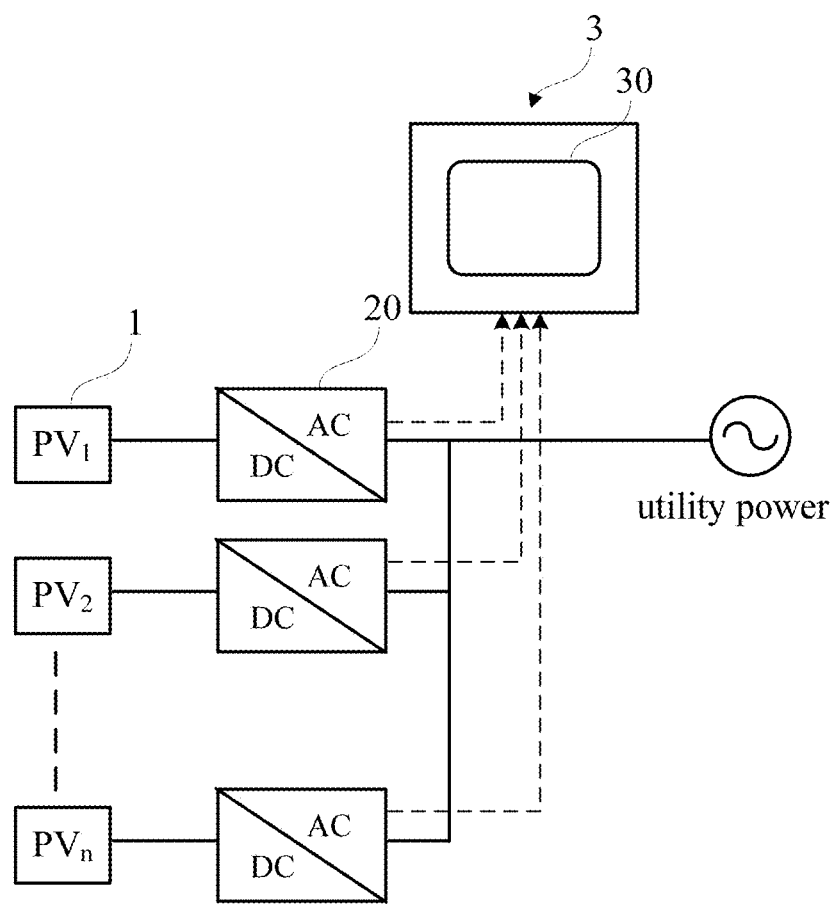
FIG. 2 is a schematic view of a power generation abnormality detection system in accordance with a first preferred embodiment of the present invention.

FIG. 2 shows a schematic view of a power generation abnormality detection system in accordance with a first preferred embodiment of the present invention. Referring to FIGS. 1 and 2, the power generation abnormality detection system of the first preferred embodiment includes an abnormality testing system 3 electrically connecting with a plurality of inverters 20 (i.e. power converter 2, as best shown in FIG. 1) which are controllably operated to measure power generation of the solar cell module 1. Meanwhile, the inverters 20 or the power converter 2 is operated to previously terminate the procedure of maximum power point tracking (MPPT) for a predetermined time. The solar cell module 1 is selected from a single solar cell module, a string of solar cell modules or a number of solar cell strings while the power converter 2 is selected from a string of inverters or micro inverters.

With continued reference to FIGS. 1 and 2, the solar cell module 1 connects with a utility power system, as best shown in right portion in FIG. 2, via the plurality of inverters 20. In abnormality detection operation, power of a plurality of the solar cell module 1 continues to supply to the utility power system while the plurality of inverters 20 are operated to control the plurality of the solar cell module 1. In another embodiment, the abnormality testing system 3 is designed to be incorporated into the inverter 20 such that the inverter 20 has a function of abnormality detection and other designated functions (e.g. MPPT function) so as to provide multiple functions.

With continued reference to FIGS. 1 and 2, in another embodiment, the abnormality testing system 3 is separated from the inverter 20 and is provided on a testing device which includes an operational control panel 30 for operators. In another embodiment, the abnormality testing system 3 connects with one or a number of inverters 20 and can be preset and operated with the operational control panel 30.

Figure 3A:
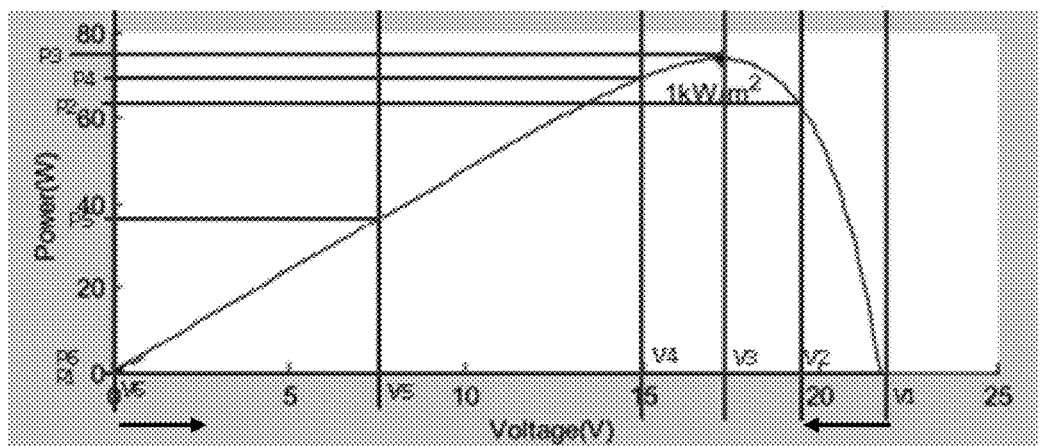
FIG. 3(A) is a diagram of power in relation to voltages for selecting a plurality of predetermined voltage points to execute a voltage-increasing or voltage-decreasing method applied in a power generation abnormality detection method for photovoltaic panels in accordance with the preferred embodiment of the present invention.

FIG. 3(A) shows a diagram of power in relation to voltages for selecting a series of predetermined voltage points to execute a voltage-increasing or voltage-decreasing method applied in a power generation abnormality detection method for photovoltaic panels in accordance with the preferred embodiment of the present invention. Referring to FIG. 3(A), a plurality of predetermined voltage points V1 (open-circuit voltage point), V2, V3, V4, V5, V6 (short-circuit voltage point) are selectively preset with a fixed time interval or a fixed rate of voltage changes along a V-P curve, with the regulation of V1>V2>V3>V4>V5>V6.

Referring again to FIGS. 1, 2 and 3(A), the power generation abnormality detection method for photovoltaic panels in accordance with the preferred embodiment of the present invention includes the step of: in voltage-decreasing testing operation, as arrowed in the left direction in FIG. 3(A), controllably operating the power converter 2 or the inverter 20 at the series of predetermined voltage points V1, V2, V3, V4, V5, V6 (or fluctuation points) by the abnormality testing system 3, thereby directly (or automatically) controlling the solar cell module 1 to be operated at the series of predetermined voltage points V1, V2, V3, V4, V5, V6, with measuring currents to obtain a plurality of measured currents in voltage-decreasing manner, with decreasingly starting from the voltage point V1 (open-circuit voltage point) to the voltage point V6 (short-circuit voltage point). In another embodiment, the solar cell module 1 is controllably operated in voltage-decreasing manner between a relatively-high voltage point and a relatively-low voltage point which are selected from any two voltage points of predetermined voltage points V1, V2, V3, V4, V5, V6.

With continued reference to FIGS. 1, 2 and 3(A), the power generation abnormality detection method for photovoltaic panels in accordance with the preferred embodiment of the present invention further includes the step of: utilizing previously-operated voltages of the predetermined voltage points V1, V2, V3, V4, V5, V6 and the measured currents to calculate a plurality of first power data P1, P2, P3, P4, P5, P6 with a predetermined power equation, i.e. calculating power generation data via the abnormality testing system 3. However, a current measured at the open-circuit voltage point (voltage point V1) is zero such that the first power data P1 is zero in calculation. On the other hand, a voltage measured at the short-circuit voltage point (voltage point V6) is zero such that the first power data P6 is also zero in calculation.

With continued reference to FIGS. 1, 2 and 3(A), the power generation abnormality detection method for photovoltaic panels in accordance with the preferred embodiment of the present invention further includes the step of: comparing the plurality of first power data P1, P2, P3, P4, P5, P6 (or first power-related data) with a first PV curve for detecting abnormality of the solar cell module 1.

With continued reference to FIGS. 1, 2 and 3(A), the power generation abnormality detection method for photovoltaic panels in accordance with another preferred embodiment of the present invention includes the step of: in voltage-increasing testing operation, as arrowed in the right direction in FIG. 3(A), controllably operating the power converter 2 or the inverter 20 at the series of predetermined voltage points V6, V5, V4, V3, V2, V1 by the abnormality testing system 3, thereby directly controlling the solar cell module 1 to be operated at the series of predetermined voltage points V6, V5, V4, V3, V2, V1, with measuring currents to obtain a plurality of measured currents in voltage-increasing manner, with increasingly starting from the voltage point V6 (short-circuit voltage point) to the voltage point V1 (open-circuit voltage point). In another embodiment, the solar cell module 1 is controllably operated in voltage-increasing manner between a relatively-low voltage point and a relatively-high voltage point which are selected from any two voltage points of predetermined voltage points V6, V5, V4, V3, V2, V1.

With continued reference to FIGS. 1, 2 and 3(A), the power generation abnormality detection method for photovoltaic panels in accordance with the preferred embodiment of the present invention further includes the step of: utilizing previously-operated voltages of the predetermined voltage points V6, V5, V4, V3, V2, V1 and the measured currents to calculate a plurality of first power data P6, P5, P4, P3, P2, P1 with a predetermined power equation, i.e. calculating power generation data via the abnormality testing system 3.

With continued reference to FIGS. 1, 2 and 3(A), the power generation abnormality detection method for photovoltaic panels in accordance with the preferred embodiment of the present invention further includes the step of: comparing the plurality of first power data P6, P5, P4, P3, P2, P1 (or first power-related data) with a first PV curve for detecting abnormality of the solar cell module 1. In yet a preferred embodiment, the power generation abnormality detection method includes the step of: alternatively executing voltage-decreasing and increasing measurements within a predetermined time interval.

Figure 3B:
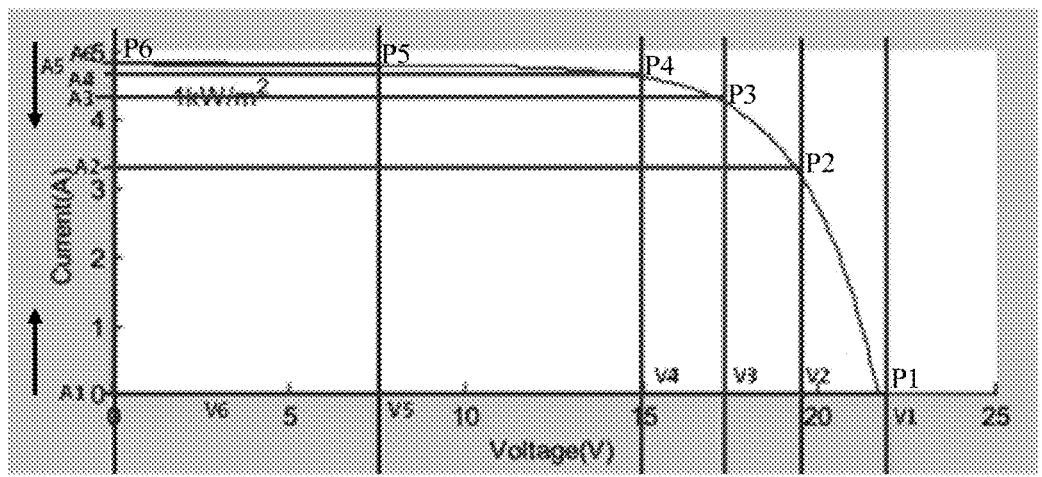
FIG. 3(B) is a diagram of currents in relation to voltages for selecting a plurality of predetermined current points to execute a current-increasing or current-decreasing method applied in the power generation abnormality detection method for photovoltaic panels in accordance with another preferred embodiment of the present invention.

FIG. 3(B) shows a diagram of currents in relation to voltages for selecting a series of predetermined current points to execute a current-increasing or current-decreasing method applied in the power generation abnormality detection method for photovoltaic panels in accordance with another preferred embodiment of the present invention. Referring to FIG. 3(B), a plurality of predetermined current points A1 (open-circuit current point), A2, A3, A4, A5, A6 (short-circuit current point) are selectively preset with a fixed time interval or a fixed rate of current changes along a V-I curve, with the regulation of A1<A2<A3<A4<A5<A6.

Referring again to FIGS. 1, 2 and 3(B), the power generation abnormality detection method for photovoltaic panels in accordance with the preferred embodiment of the present invention includes the step of: in current-increasing testing operation, as arrowed in the upward direction in FIG. 3(B), controllably operating the power converter 2 or the inverter 20 at the series of predetermined current points A1, A2, A3, A4, A5, A6 (or fluctuation points) by the abnormality testing system 3, thereby directly (or automatically) controlling the solar cell module 1 to be operated at the series of predetermined current points A1, A2, A3, A4, A5, A6, with measuring voltages to obtain a plurality of measured voltages in current-increasing manner, with increasingly starting from the current point A1 (open-circuit current point) to the current point A6 (short-circuit current point). In another embodiment, the solar cell module 1 is controllably operated in current-increasing manner between a relatively-low current point and a relatively-high current point which are selected from any two current points of predetermined current points A1, A2, A3, A4, A5, A6.

With continued reference to FIGS. 1, 2 and 3(B), the power generation abnormality detection method for photovoltaic panels in accordance with the preferred embodiment of the present invention further includes the step of: utilizing previously-operated currents of the predetermined current points A1, A2, A3, A4, A5, A6 and the measured voltages to calculate a plurality of second power data P1, P2, P3, P4, P5, P6 with a predetermined power equation, i.e. calculating power generation data via the abnormality testing system 3. However, a current of the open-circuit current point (current point A1) is zero such that the second power data P1 is zero in calculation.

With continued reference to FIGS. 1, 2 and 3(B), the power generation abnormality detection method for photovoltaic panels in accordance with the preferred embodiment of the present invention further includes the step of: comparing the plurality of second power data P1, P2, P3, P4, P5, P6 (or second power-related data) with a second PV or VI curve for detecting abnormality of the solar cell module 1.

With continued reference to FIGS. 1, 2 and 3(B), the power generation abnormality detection method for photovoltaic panels in accordance with another preferred embodiment of the present invention includes the step of: in current-decreasing testing operation, as arrowed in the downward direction in FIG. 3(B), controllably operating the power converter 2 or the inverter 20 at the series of predetermined current points A6, A5, A4, A3, A2, A1 by the abnormality testing system 3, thereby directly controlling the solar cell module 1 to be operated at the series of predetermined current points A6, A5, A4, A3, A2, A1, with measuring voltages to obtain a plurality of measured voltages in current-decreasing manner, with decreasingly starting from the current point A6 (short-circuit current point) to the current point A1 (open-circuit current point). In another embodiment, the solar cell module 1 is controllably operated in current-decreasing manner between a relatively-high current point and a relatively-low current point which are selected from any two current points of predetermined current points A6, A5, A4, A3, A2, A1.

With continued reference to FIGS. 1, 2 and 3(B), the power generation abnormality detection method for photovoltaic panels in accordance with the preferred embodiment of the present invention further includes the step of: utilizing previously-operated currents of the predetermined current points A6, A5, A4, A3, A2, A1 and the measured voltages to calculate a plurality of second power data P6, P5, P4, P3, P2, P1 with a predetermined power equation, i.e. calculating power generation data via the abnormality testing system 3.

With continued reference to FIGS. 1, 2 and 3(B), the power generation abnormality detection method for photovoltaic panels in accordance with the preferred embodiment of the present invention further includes the step of: comparing the plurality of second power data P6, P5, P4, P3, P2, P1 (or second power-related data) with a second PV or VI curve for detecting abnormality of the solar cell module 1. In yet a preferred embodiment, the power generation abnormality detection method includes the step of: alternatively executing current-increasing and decreasing measurements within a predetermined time interval.

Referring again to FIGS. 3(A) and 3(B), in yet a preferred embodiment, the power generation abnormality detection method includes the step of: firstly executing voltage-decreasing or voltage-increasing measurements with the plurality of predetermined voltage points V1, V2, V3, V4, V5, V6, as shown in FIG. 3(A) and further reversely executing current-increasing or current-decreasing measurements with the plurality of predetermined current points A1, A2, A3, A4, A5, A6, as shown in FIG. 3(B). In yet a further preferred embodiment, the power generation abnormality detection method includes the step of: firstly executing current-increasing or current-decreasing measurements with the plurality of predetermined current points A1, A2, A3, A4, A5, A6, as shown in FIG. 3(B) and further reversely executing voltage-decreasing or voltage-increasing measurements with the plurality of predetermined voltage points V1, V2, V3, V4, V5, V6, as shown in FIG. 3(A).

Figure 4:
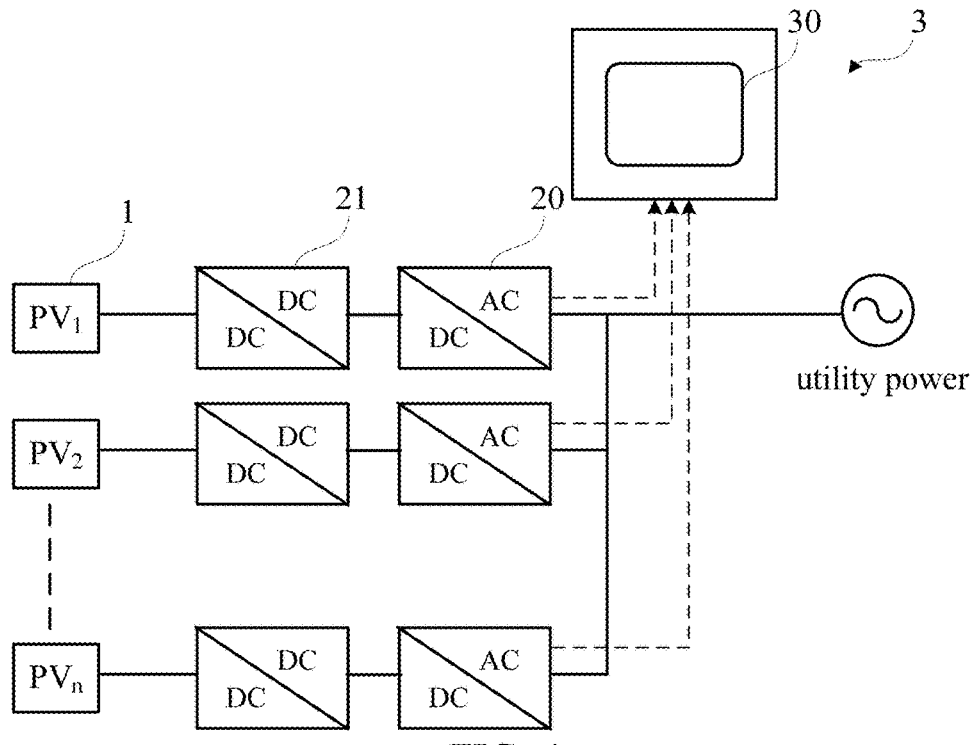
FIG. 4 is a schematic view of the power generation abnormality detection system in accordance with a second preferred embodiment of the present invention.

FIG. 4 shows a schematic view of the power generation abnormality detection system in accordance with a second preferred embodiment of the present invention. Referring now to FIG. 4, the power generation abnormality detection system of the second preferred embodiment includes the abnormality testing system 3 connecting with the inverter 20, with providing a DC-DC boost power converter 21.

Figure 5:
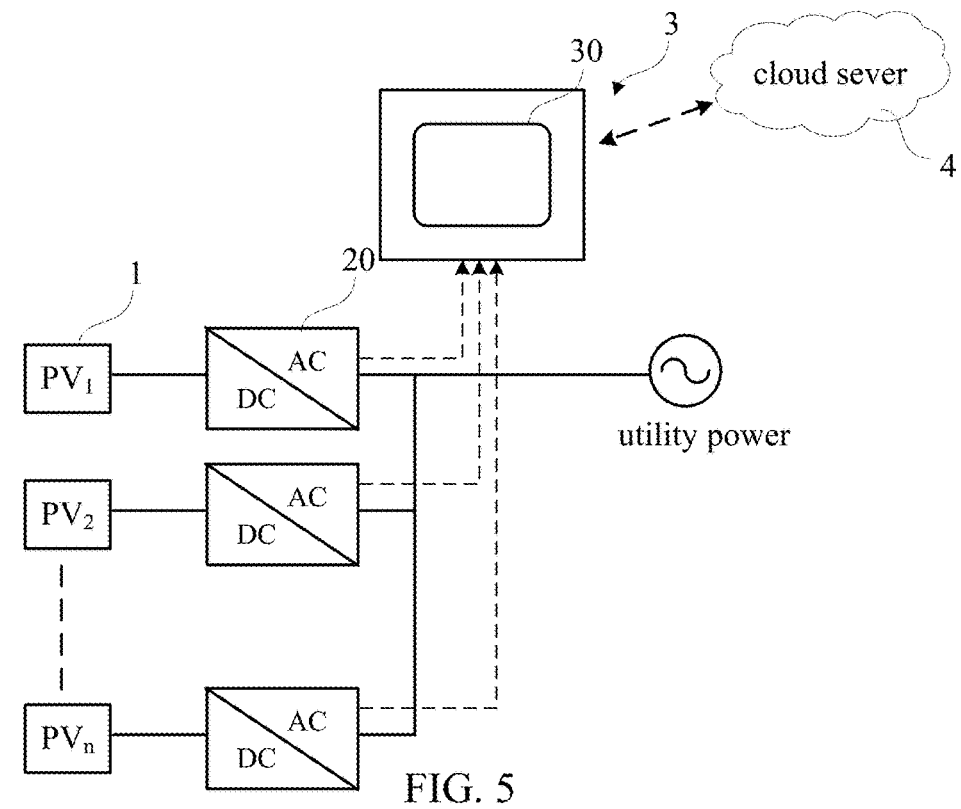
FIG. 5 is a schematic view of the power generation abnormality detection system in accordance with a third preferred embodiment of the present invention.

FIG. 5 shows a schematic view of the power generation abnormality detection system in accordance with a third preferred embodiment of the present invention. Referring now to FIG. 5, the power generation abnormality detection system of the third preferred embodiment includes the abnormality testing system 3 connecting with a cloud server 4 or a remote monitoring system which can automatically identify the abnormality of the solar cell module 1.

Figure 6:
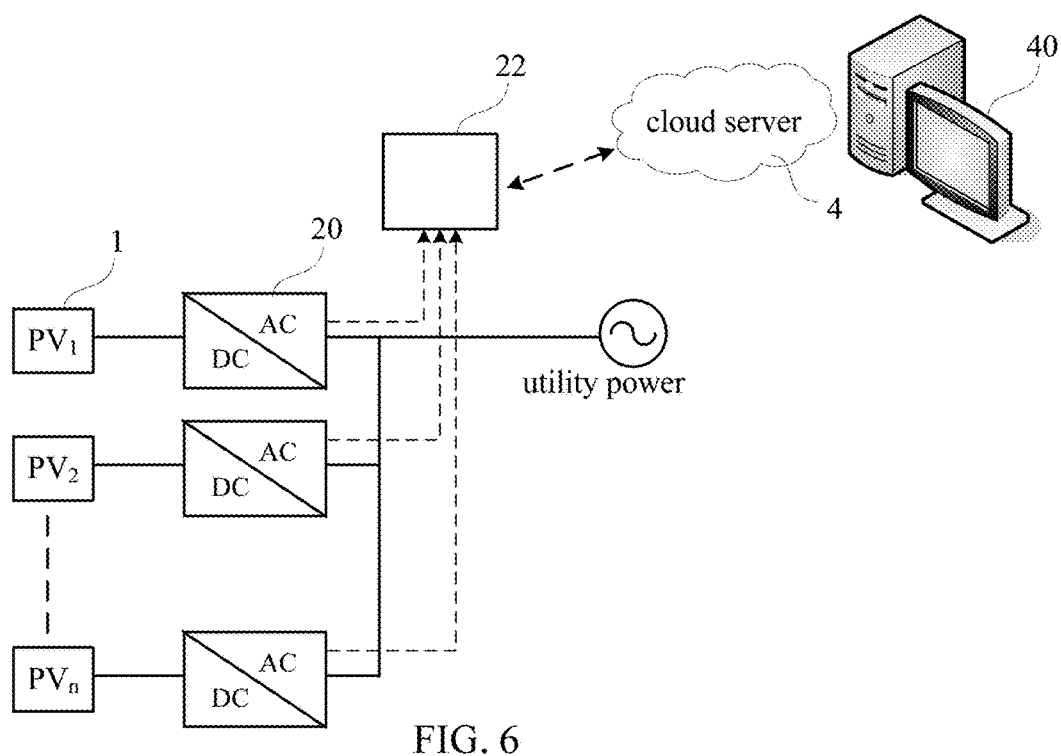
FIG. 6 is a schematic view of the power generation abnormality detection system in accordance with a fourth preferred embodiment of the present invention.

FIG. 6 shows a schematic view of the power generation abnormality detection system in accordance with a fourth preferred embodiment of the present invention. Referring now to FIG. 6, the power generation abnormality detection system of the fourth preferred embodiment includes the cloud server 4 or the remote monitoring system provided with a remote testing system 40, with the inverter 20 further connecting with a data-transmitting module 22 or a wireless transmission module. The remote testing system 40 further connects with the inverter 20 wirelessly or via a cable for identifying the abnormality of the solar cell module 1.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. A power generation abnormality detection method for photovoltaic panels comprising:

controllably operating a solar cell module at a series of predetermined selected voltage point positions by controlling a power converter or an inverter, with the solar cell module continuing to supply power to a utility power system at the series of predetermined selected voltage point positions while testing;

retrieving a series of measured currents corresponding to the series of predetermined selected voltage point positions;

utilizing previously-operated voltages of the predetermined selected voltage point positions and the measured currents to calculate a plurality of first power data or first power-related data with a predetermined equation; and comparing the plurality of first power data or first power-related data with a first PV curve to detect an abnormality of the solar cell module.

2. The power generation abnormality detection method for photovoltaic panels as defined in claim 1, wherein the series of predetermined selected voltage point positions are a plurality of voltage-decreasing points, the plurality of voltage-decreasing points decreasing from a high voltage point to a low voltage point, with the solar cell module continuing to supply power to the utility power system at the series of predetermined selected voltage point positions while voltage-decreasing testing.

3. The power generation abnormality detection method for photovoltaic panels as defined in claim 2, wherein the plurality of voltage-decreasing points decrease from an open-circuit voltage point to a short-circuit voltage point.

4. The power generation abnormality detection method for photovoltaic panels as defined in claim 1, wherein the series of predetermined selected voltage point positions are a plurality of voltage-increasing points, the plurality of voltage-increasing points increasing from a low voltage point to a high voltage point, with the solar cell module continuing to supply power to the utility power system at the series of predetermined selected voltage point positions while voltage-increasing testing.

5. The power generation abnormality detection method for photovoltaic panels as defined in claim 4, wherein the plurality of voltage-increasing points increase from a short-circuit voltage point to an open-circuit voltage point.

6. A power generation abnormality detection method photovoltaic panels comprising:

controllably operating a solar cell module a series of predetermined selected current point positions by controlling a power converter or an inverter, with the solar cell module continuing to supply power to a utility power system at the series of predetermined selected current point positions while testing;

retrieving a series of measured voltages corresponding to the series of predetermined selected current point positions;

utilizing previously-operated currents of the predetermined selected current point positions and the measured voltages to calculate a plurality of second power data or second power-related data with a predetermined equation; and comparing the second power data or second power-related data with a second PV curve to detect an abnormality of the solar cell module.

7. The power generation abnormality detection method for photovoltaic panels as defined in claim 6, wherein the series of predetermined selected current point positions are a plurality of current-decreasing points, the plurality of current-decreasing points decreasing from a high current point to a low current point, with the solar cell module continuing to supply power to the utility power system at the series of predetermined selected current point positions while current-decreasing testing.

8. The power generation abnormality detection method for photovoltaic panels as defined in claim 7, wherein the plurality of current-decreasing points decrease from a short-circuit current point to an open-circuit current point.

9. The power generation abnormality detection method for photovoltaic panels as defined in claim 6, wherein the series of predetermined selected current point positions are a plurality of current-increasing points, with the plurality of current-increasing points increasing from a low current point to a high current point, with the solar cell module continuing to supply power to the utility power system at the series of predetermined selected current point positions while current-increasing testing.

10. The power generation abnormality detection method for photovoltaic panels as defined in claim 9, wherein the plurality of current-increasing points increase from an open-circuit current point to a short-circuit current point.

11. A power generation abnormality detection system for photovoltaic panels comprising:

at least one solar cell module including solar cell sub-modules;

at least one power converter connecting with the solar cell module; and an abnormality testing system connecting with the power converter;

wherein, in a voltage control mode, the solar cell module is controllably operated at a series of predetermined selected voltage point positions by controlling a power converter, with the solar cell module continuing to supply power to a utility power system at the series of predetermined selected voltage point positions while testing, thereby retrieving a series of measured currents corresponding to the series of predetermined voltage points, with utilizing previously-operated voltages of the predetermined voltage points and the measured currents to calculate a plurality of first power data with a first predetermined equation, with comparing the plurality of first power data with a first PV curve for abnormality detection; or wherein, in a current control mode, the cell module is controllably operated at a series of predetermined selected current point positions by controlling the power converter, with the solar cell module continuing to supply power to the utility power system at the series of predetermined selected current point positions while testing, thereby retrieving a series of measured voltages corresponding to the series of predetermined current points, with utilizing previously-operated currents of the predetermined current points and the measured voltages to calculate a plurality of second power data with a second predetermined equation, with comparing the with plurality of second power data a second PV curve for abnormality detection.

12. The power generation abnormality detection system for the photovoltaic panels as defined in claim 11, wherein the series of predetermined selected voltage point positions are a plurality of voltage-decreasing points, with the plurality of voltage-decreasing points decreasing from a high voltage point to a low voltage point, with the solar cell module continuing to supply power to the utility power system at the series of predetermined selected voltage point positions while voltage-decreasing testing.

13. The power generation abnormality detection system for photovoltaic panels as defined in claim 12, wherein the plurality of voltage-decreasing points decrease from an open-circuit voltage point to a short-circuit voltage point.

14. The power generation abnormality detection system for photovoltaic panels as defined in claim 11, wherein the series of predetermined selected voltage point positions are a plurality of voltage-increasing points, with the plurality of voltage-increasing points increasing from a low voltage point to a high voltage point, with the solar cell module continuing to supply power to the utility power system at the series of predetermined selected voltage point positions while voltage-increasing testing.

15. The power generation abnormality detection system for photovoltaic panels as defined in claim 14, wherein the plurality of voltage-increasing points increase from a short-circuit voltage point to an open-circuit voltage point.

16. The power generation abnormality detection system for photovoltaic panels as defined in claim 11, wherein the series of predetermined selected current point positions are a plurality of current-decreasing points, with the plurality of current-decreasing points decreasing from a high current point to a low current point.

17. The power generation abnormality detection system for photovoltaic panels as defined in claim 16, wherein the plurality of current-decreasing points decrease from a short-circuit current point to an open-circuit current point.

18. The power generation abnormality detection system for photovoltaic panels as defined in claim 11, wherein the series of predetermined selected current point positions are a plurality of current-increasing points, with the plurality of current-increasing points increasing from a low current point to a high current point.

19. The power generation abnormality detection system for photovoltaic panels as defined in claim 18, wherein the plurality of current-increasing points increase from an open-circuit current point to a short-circuit current point.

20. The power generation abnormality detection system for photovoltaic panels as defined in claim 11, wherein the abnormality testing system connects with a cloud server.

* * * * *